US012289065B2

(12) United States Patent
Noguchi

(10) Patent No.: US 12,289,065 B2
(45) Date of Patent: Apr. 29, 2025

(54) MOTOR HAVING MOVABLE HOLDING MEMBERS, DRIVING APPARATUS, LENS APPARATUS, AND IMAGE PICKUP APPARATUS

(71) Applicant: CANON KABUSHIKI KAISHA, Tokyo (JP)

(72) Inventor: Kazuhiro Noguchi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 18/182,549

(22) Filed: Mar. 13, 2023

(65) Prior Publication Data

US 2023/0299694 A1    Sep. 21, 2023

(30) Foreign Application Priority Data

Mar. 15, 2022   (JP) ................. 2022-040658

(51) Int. Cl.
 *H02N 2/02*  (2006.01)
 *G02B 7/04*  (2021.01)
 *H02N 2/00*  (2006.01)

(52) U.S. Cl.
 CPC .............. *H02N 2/026* (2013.01); *G02B 7/04* (2013.01); *H02N 2/0055* (2013.01)

(58) Field of Classification Search
 CPC ........ H02N 2/026; H02N 2/0055; G02B 7/04; G02B 7/08
 See application file for complete search history.

(56) References Cited

U.S. PATENT DOCUMENTS 11,533,002 B2    12/2022  Osawa
11,621,654 B2 *   4/2023  Noguchi .............. H02N 2/0055
                                                  310/323.03

FOREIGN PATENT DOCUMENTS

JP       2021002967 A    1/2021

* cited by examiner

*Primary Examiner* — Emily P Pham
(74) *Attorney, Agent, or Firm* — ROSSI, KIMMS & McDOWELL LLP

(57) ABSTRACT

A motor includes a vibrator, a contact member that contacts the vibrator, a first pressing unit that applies a pressing force in a first direction to the vibrator to bring the vibrator into contact with the contact member, a first holding member that holds the vibrator, a second holding member that holds the first holding member, and a second pressing unit that applies to the first holding member a pressing force in a second direction in which the vibrator and the contact member are displaced relative to each other by generated thrust. The first and second holding members contact each other in the second direction due to the pressing force of the second pressing unit. The first and second holding members are movable relative to each other in the first direction by the pressing force of the first pressing unit.

8 Claims, 8 Drawing Sheets

MOTOR HAVING MOVABLE HOLDING MEMBERS, DRIVING APPARATUS, LENS APPARATUS, AND IMAGE PICKUP APPARATUS

BACKGROUND

Technical Field

One of the aspects of the disclosure relates to a motor, a driving apparatus, a lens apparatus, and an image pickup apparatus.

Description of the Related Art

In some conventional vibration wave motors, a vibrator, in which a piezoelectric body and an elastic body are integrated by adhesion, etc., is brought into pressure contact with a contact member by a pressing unit and vibrated in a desired deformation mode at a frequency higher than the audible frequency range to generate thrust. In addition, it is known that the vibration wave motor vibrating the vibrator at a predetermined frequency generates noise. This noise deteriorates the quality of the vibration wave motor. Japanese Patent Laid-Open No. ("JP") 2021-2967 discloses a vibration wave motor that suppresses the noise caused by vibrating the vibrator at the predetermined frequency.

The vibration wave motor disclosed in JP 2021-2967 can suppress the noise when a damping material bends against unnecessary vibration. However, this vibration wave motor does not consider noises based on a variety of natural vibration modes, and thus cannot sufficiently suppress the noise.

SUMMARY

One of the aspects of the embodiment provides a motor that can sufficiently suppress noise.

A motor according to one aspect of the disclosure includes a vibrator, a contact member that contacts the vibrator, a first pressing unit that applies a pressing force in a first direction to the vibrator to bring the vibrator into contact with the contact member, a first holding member that holds the vibrator, a second holding member that holds the first holding member, and a second pressing unit that applies to the first holding member a pressing force in a second direction in which the vibrator and the contact member are displaced relative to each other by generated thrust. The first holding member and the second holding member contact each other in the second direction due to the pressing force of the second pressing unit. The first holding member and the second holding member are movable relative to each other in the first direction by the pressing force of the first pressing unit. A driving apparatus and a lens apparatus each including the above motor also constitute another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Figure 1A:
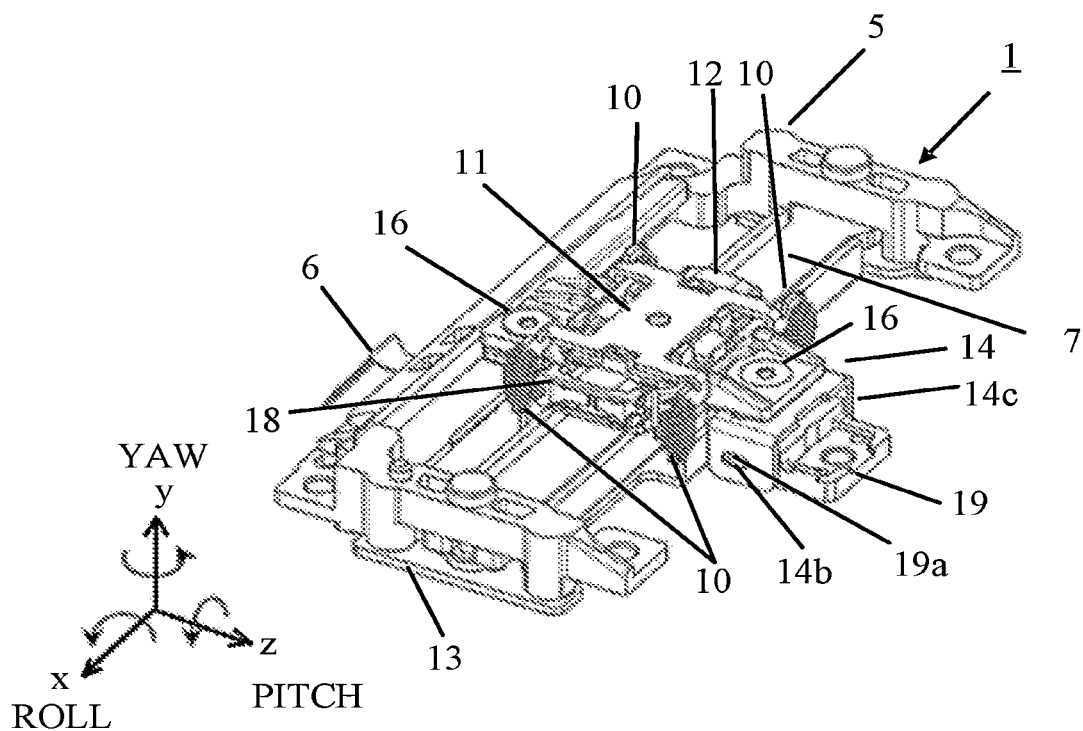
FIGS. 1A and 1B are perspective views of a vibration wave motor according to this embodiment.
Figure 1B:
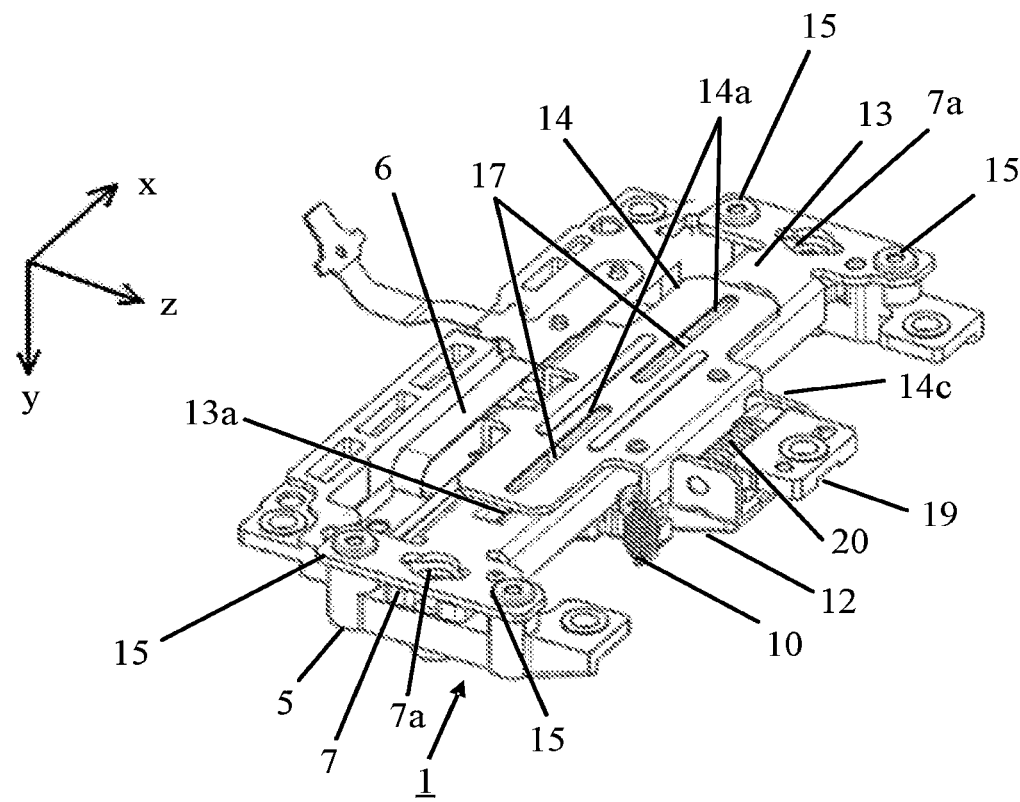
Figure 2:
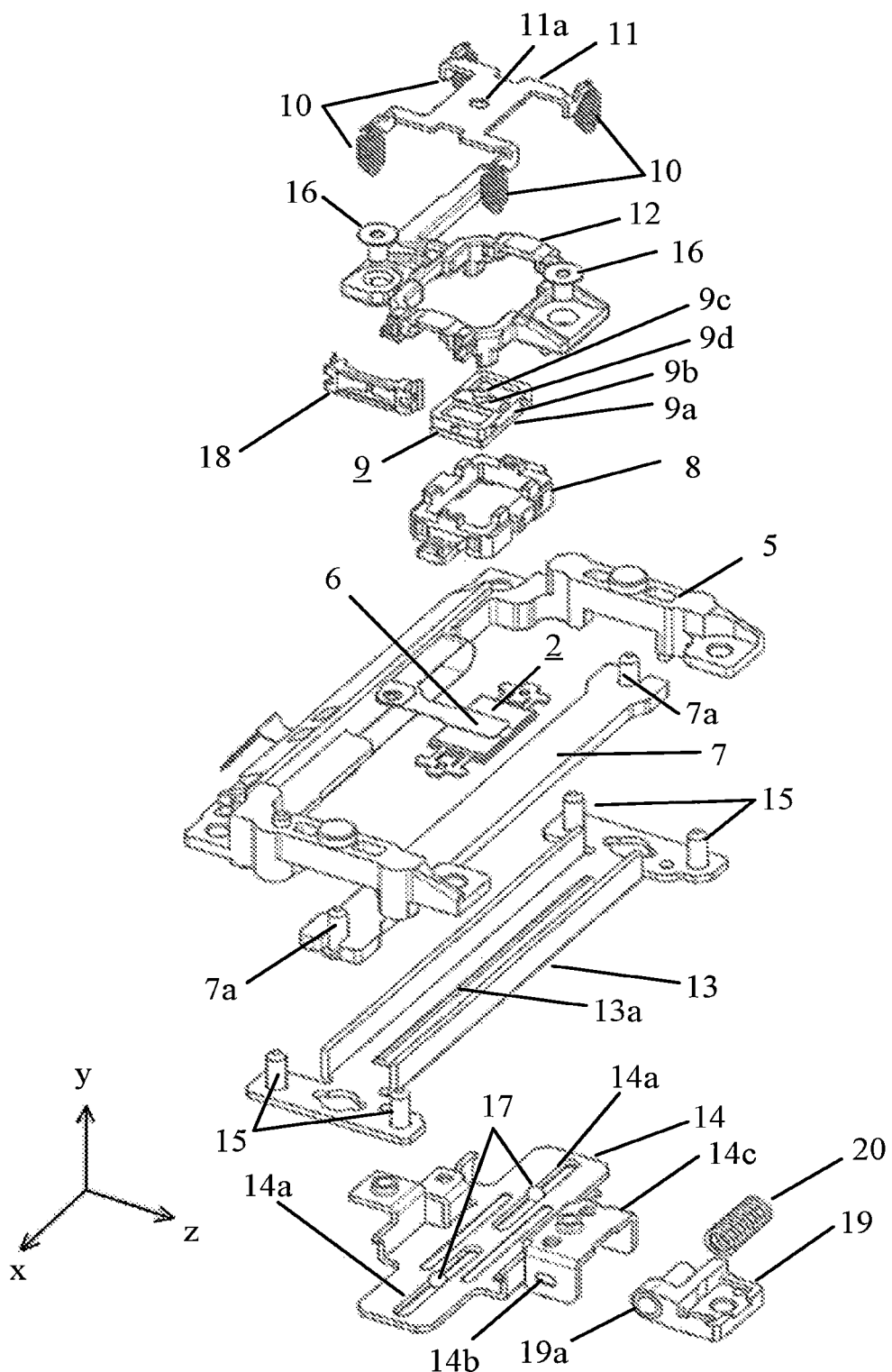
FIG. 2 is an exploded perspective view of the vibration wave motor according to this embodiment.
Figure 3A:
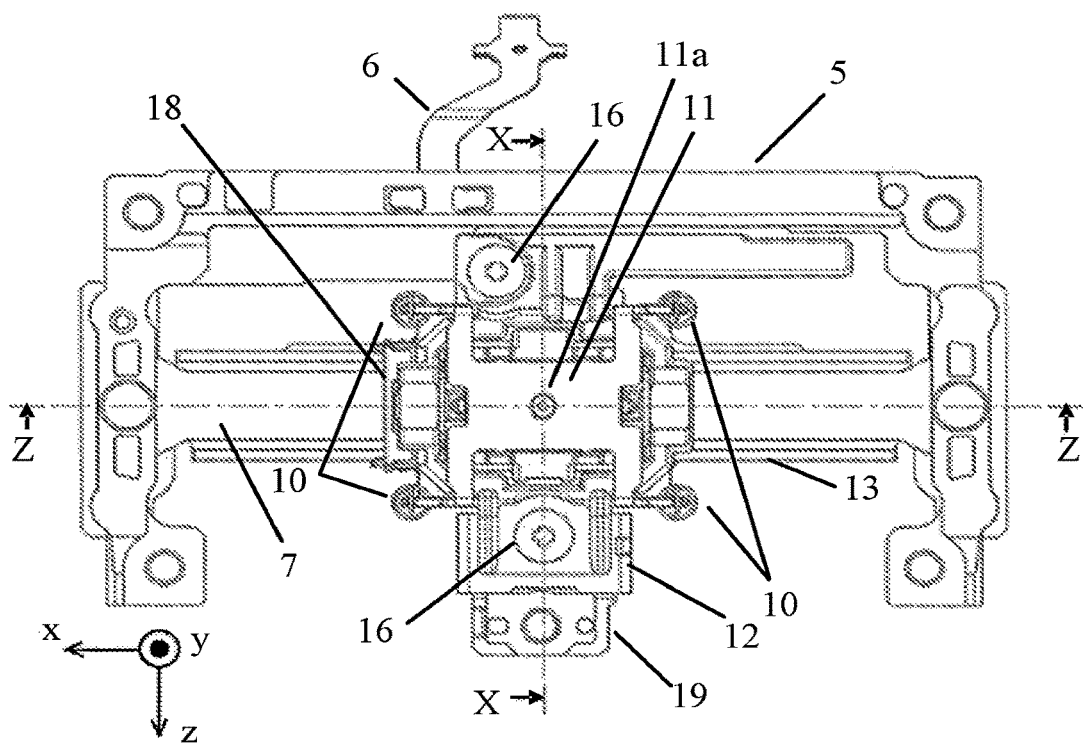
FIGS. 3A to 3C are a plan view and sectional views of the vibration wave motor according to this embodiment.
Figure 3B:
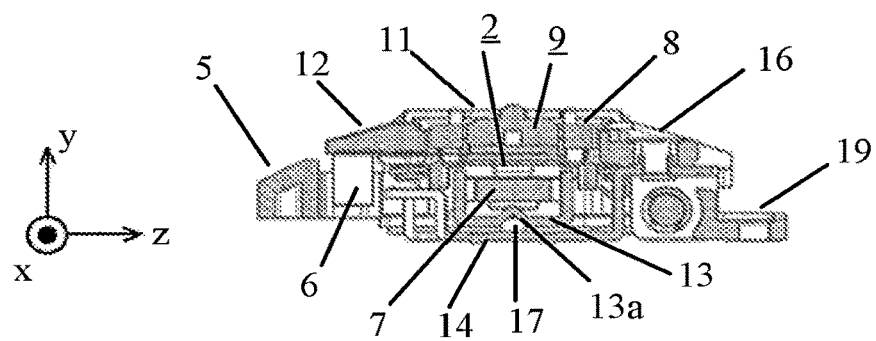
Figure 3C:
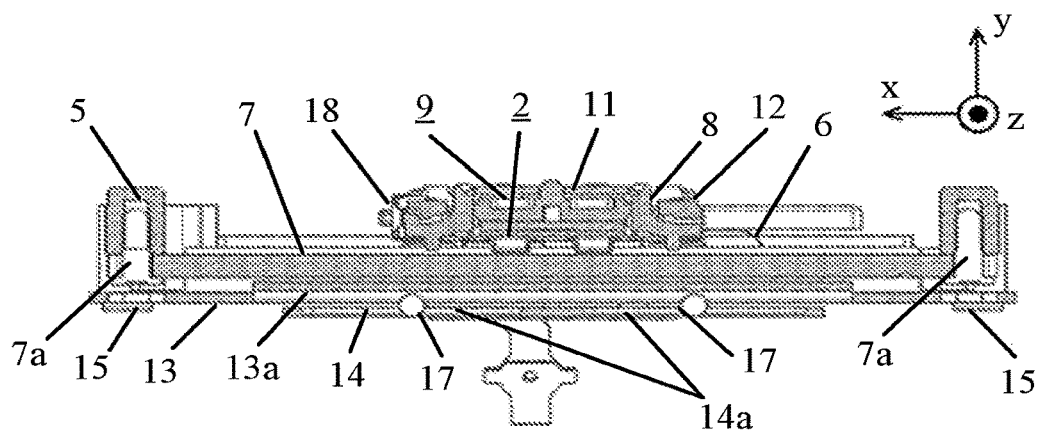

Referring now to FIGS. 1A to 3C, a description will be given of a vibration wave motor 1 (ultrasonic motor) according to this embodiment. FIGS. 1A and 1B are perspective views of the vibration wave motor 1. FIG. 1A illustrates the vibration wave motor 1 viewed from the front side, and FIG. 1B illustrates the vibration wave motor 1 viewed from the rear side. FIG. 2 is an exploded perspective view of the vibration wave motor 1. FIGS. 3A to 3C are plan and sectional views of the vibration wave motor 1. FIG. 3A is a plan view viewed from a positive direction of a y-axis. FIG. 3B is a sectional view taken along a line X-X in FIG. 3A. FIG. 3C is a sectional view taken along a line Z-Z in FIG. 3A.

In this embodiment, coordinate axes are defined as illustrated in FIG. 1A. An x-axis is an axis in a thrust generating direction of the vibration wave motor 1 and is an axis in a direction (second direction) in which a vibrator 2 and a friction member 7 (contact member) are displaced relative to each other. A y-axis is an axis in a direction (first direction) in which the vibrator 2 is brought into contact with the friction member 7. A z-axis is an axis orthogonal to the x-axis and the y-axis. The degree of freedom of rotation about each axis will be referred to as "roll" about the x-axis, "yaw" about the y-axis, and "pitch" around the z-axis. FIG. 1B illustrates a perspective view of the vibration wave motor 1 rotated by 180 degrees about the z-axis from the state illustrated in FIG. 1A and viewed from the rear side.

Figure 4A:
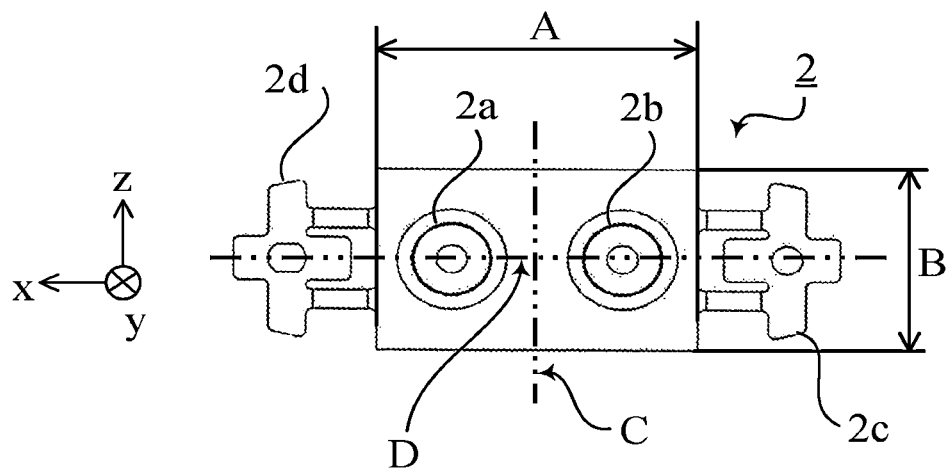
FIGS. 4A and 4B explain a vibrator according to this embodiment.
Figure 4B:
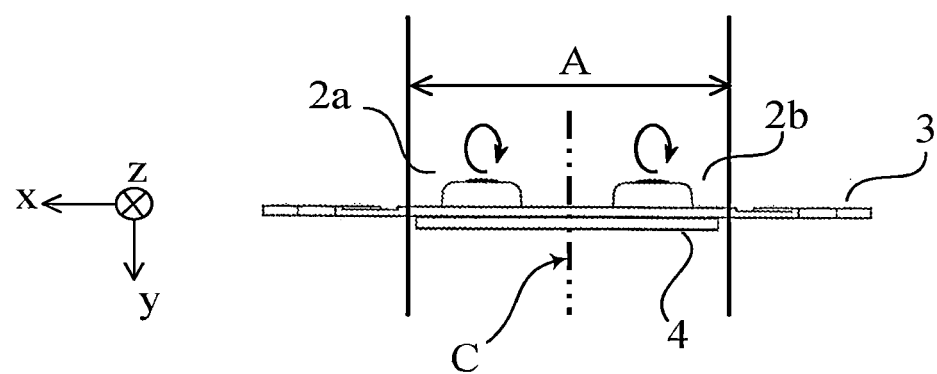

A base member 5 is a fixed portion of the vibration wave motor 1. A flexible substrate (flexible printed circuit: FPC) 6 is provided to apply a two-phase high-frequency voltage to the vibrator 2, and mechanically and electrically connected to a piezoelectric body 4 with anisotropic conductive paste or the like. The friction member 7 is fixed to the base member 5 with two screws 7a. A vibrator holding frame (first holding member) 8 is integrated with the vibrator 2 because fixing arm portions 2c and 2d of the vibrator 2 (see FIG. 4) are fixed to it by adhesion or the like. A pressure intermediary member 9 includes a felt 9a that directly contacts the vibrator 2 and a highly rigid member 9b that directly receives the pressing force. The felt 9a transmits the pressing force without preventing the vibration excited by the vibrator 2. Four tension coil springs 10 generate pressing forces. A pressure plate 11 receives the forces from the four tension coil springs 10. The pressure plate 11 has a reference elongated hole 11a, the pressure intermediary member 9 has a reference pin 9c that is engaged with the reference elongated hole 11a, and contact cylindrical surfaces 9d on both sides of the reference pin 9c, and the back surface of the pressure plate 11 contacts the reference pin 9c and the cylindrical surfaces 9d. The contact position is located in a front-rear symmetry plane C of the vibrator 2, as illustrated in FIGS. 4A and 4B described below.

A movable unit outer frame (second holding member) 12 holds the vibrator holding frame 8. A guide member 13 is fixed to the base member 5 with four screws 15. A movable member 14 receives the pressing forces from the four tension coil springs 10. The movable member 14 has two linear (or rectilinear) guide grooves 14a in the x-axis direction. The guide member 13 has a guide groove 13a corresponding to two linear guide grooves 14a. Two rolling balls 17 are sandwiched between the two linear guide grooves 14a and the guide groove 13a and receive pressing forces from the four tension coil springs 10. The movable member 14 and the movable unit outer frame 12 are integrated with two screws 16. This configuration linearly guides the movable unit outer frame 12 in the x-axis direction (second direction).

A biasing leaf spring (second pressing unit) 18 is integrated with the movable unit outer frame 12 and applies a pressing force to the vibrator holding frame 8 in the thrust generating direction (second direction). A connecting member 19 transmits the thrust of the vibration wave motor 1 to a driven member. The movable member 14 has a U-shaped portion 14c and a long groove portion 14b having a V-shaped surface. The connecting member 19 has a spherical projection 19a. A compression coil spring 20 brings the spherical projection 19a into contact with the V-shaped surface of the long groove portion 14b, so that the movable member 14 and the connecting member 19 are engaged. The connecting member 19 is positioned and fixed with screws or the like to the driven member supported by an unillustrated well-known linear guide mechanism.

As described above, in the movable member 14 and the movable unit outer frame 12 integrated by the two screws 16, the two linear guide grooves 14a contact the guide groove 13a via the two rolling balls 17 by the four tension coil springs 10. Therefore, the movable member 14 and the movable unit outer frame 12 are movable relative to each other in the second direction, and the orientation of the movable member 14 and the movable unit outer frame 12 is determined in the yz plane because the engagement between the spherical projection 19a and the V-shaped surface of the long groove portion 14b restricts the rotation about the linear guide. The four tension coil springs 10 engaged with a movable member 14 whose orientation in the yz plane is determined bring the vibrator 2 into contact with the friction member 7 via the pressure plate 11 and the pressure intermediary member 9. Thus, the pressure intermediary member 9, the tension coil springs 10, and the pressure plate 11 constitute a pressing unit (first pressing unit) that applies a pressing force in the first direction to the vibrator 2. By reliably bringing the vibrator 2 into contact with the friction member 7 with a desired pressing force, the vibration wave motor 1 can be stably driven.

Referring now to FIGS. 4A and 4B, a description will be given of the configuration of vibrator 2. FIGS. 4A and 4B explain the vibrator 2. FIG. 4A is a plan view of the vibrator 2 viewed from the negative direction of the y-axis, and FIG. 4B is a side view of the vibrator 2, respectively. The vibrator 2 is constructed by fixing a vibration plate (elastic body) 3 and the piezoelectric body 4 with an adhesive or the like. A rectangular area A×B in FIG. 4A corresponds to a driving force generating portion. The two-phase high-frequency voltage applied to the piezoelectric body 4 excites elliptical motions at the tips of driving protrusions 2a and 2b along the xy plane as illustrated in FIG. 4B. In a case where the friction member 7 is brought into pressure contact with the driving protrusions 2a and 2b, thrust in the x-axis direction is generated. The fixing arms 2c and 2d are provided to fix vibrator 2. C denotes the front-rear symmetry plane orthogonal to the driving direction x-axis of the driving force generating portion A×B including the driving protrusions 2a and 2b, and D denotes a left-right symmetry plane.

Referring now to FIGS. 5A to 5D, a description will be given of the relationship between the vibrator holding frame 8 and the movable unit outer frame 12. FIGS. 5A to 5D explain a relationship between the vibrator holding frame 8 and the movable unit outer frame 12.

Figure 5A:
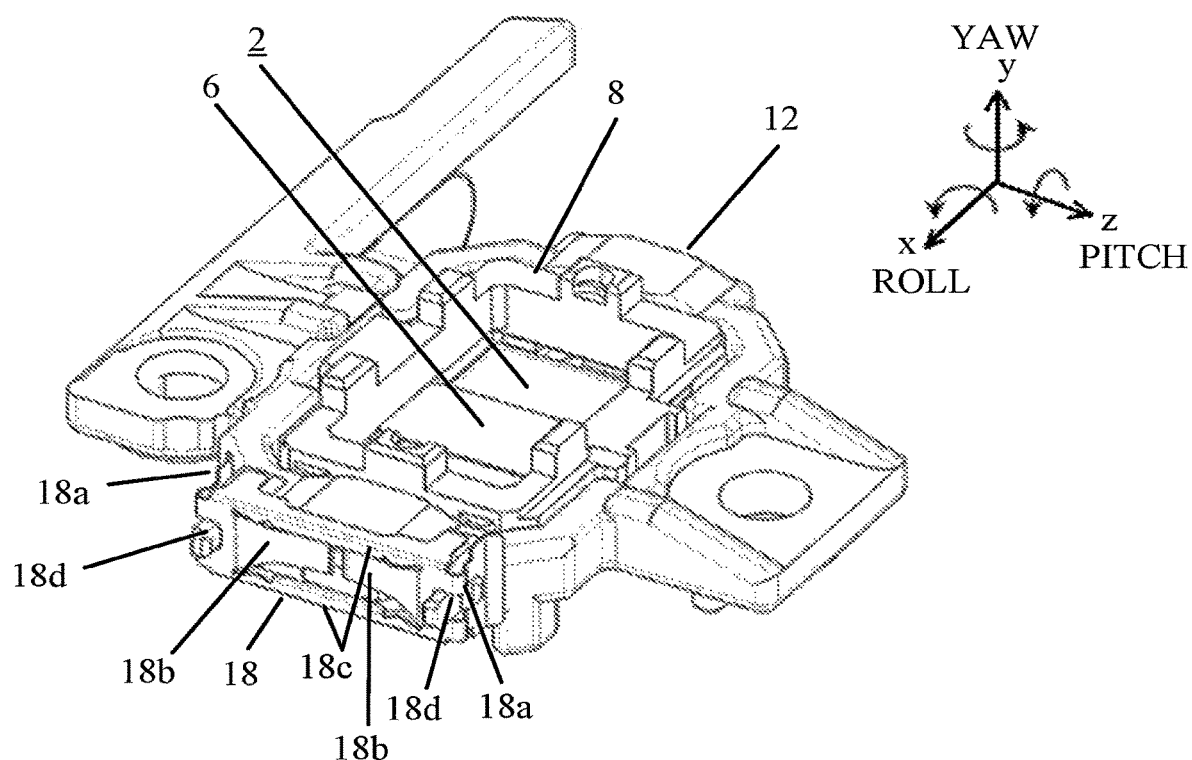
FIGS. 5A to 5D explain a relationship between a vibrator holding frame and an outer frame of a movable part in this embodiment.

FIG. 5A is a perspective view illustrating a combined state of the vibrator holding frame 8, the movable unit outer frame 12, and the biasing leaf spring 18 in an operable state of the vibration wave motor 1. FIG. 5A omits irrelevant elements, and the coordinate axes are oriented in the same direction. The biasing leaf spring 18 includes hook portions 18a engageable with the movable unit outer frame 12, spring portions 18b that generate biasing forces when bent, connecting portions 18c that maintain the entire strength, and reference portions 18d for attachment.

Figure 5B:
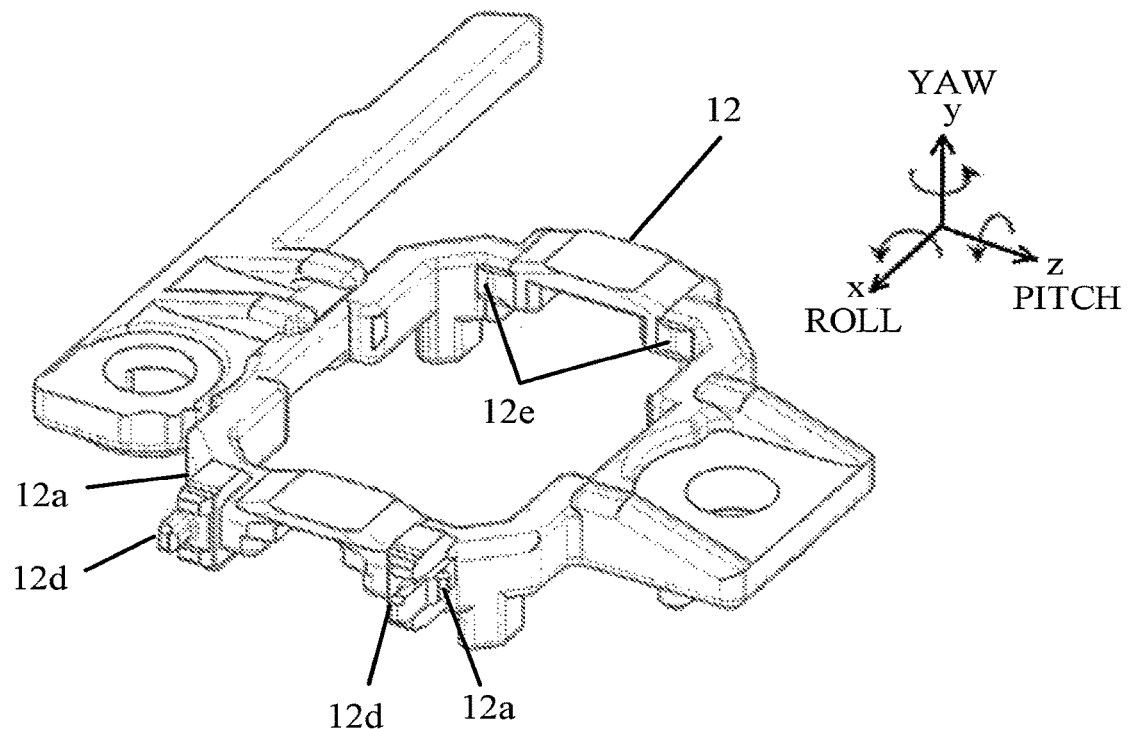

FIG. 5B is a perspective view of the movable unit outer frame 12 alone. The hook portions 18a of the biasing leaf spring 18 are attached to projecting portions 12a. The reference portions 18d of the biasing leaf spring 18 are engaged with reference projection portions 12d. Reference surfaces 12e are reference surfaces (second reference surfaces of the movable unit outer frame 12) for the position of the vibrator holding frame 8 in the x-axis direction, and are plane portions each having a predetermined length in the y-axis direction.

Figure 5C:
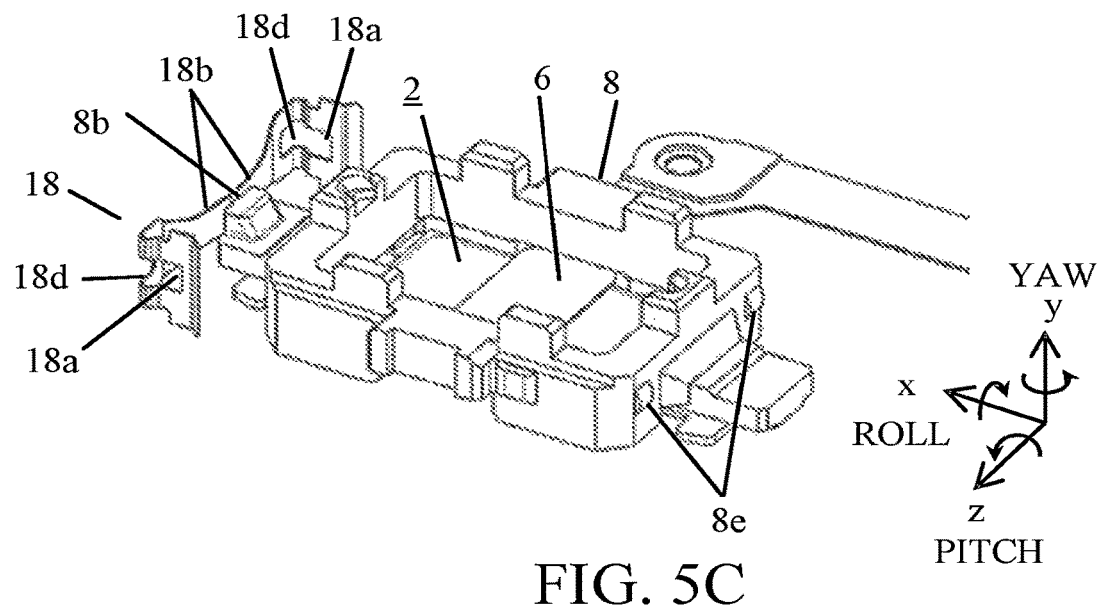

FIG. 5C is a perspective view of the vibrator holding frame 8 and the biasing leaf spring 18. The biasing leaf spring 18 is attached to the movable unit outer frame 12. FIG. 5C omits the connecting portions 18c for maintaining the entire strength for better understanding of the shape. The orientation of the perspective view of FIG. 5C is indicated by the coordinate axes. A protrusion portion 8b receives the pressing force of the biasing leaf spring 18 in the x-axis direction. Reference surfaces 8e are reference surfaces (first reference surfaces of the vibrator holding frame 8) for the position of the vibrator holding frame 8 in the x-axis direction.

Figure 5D:
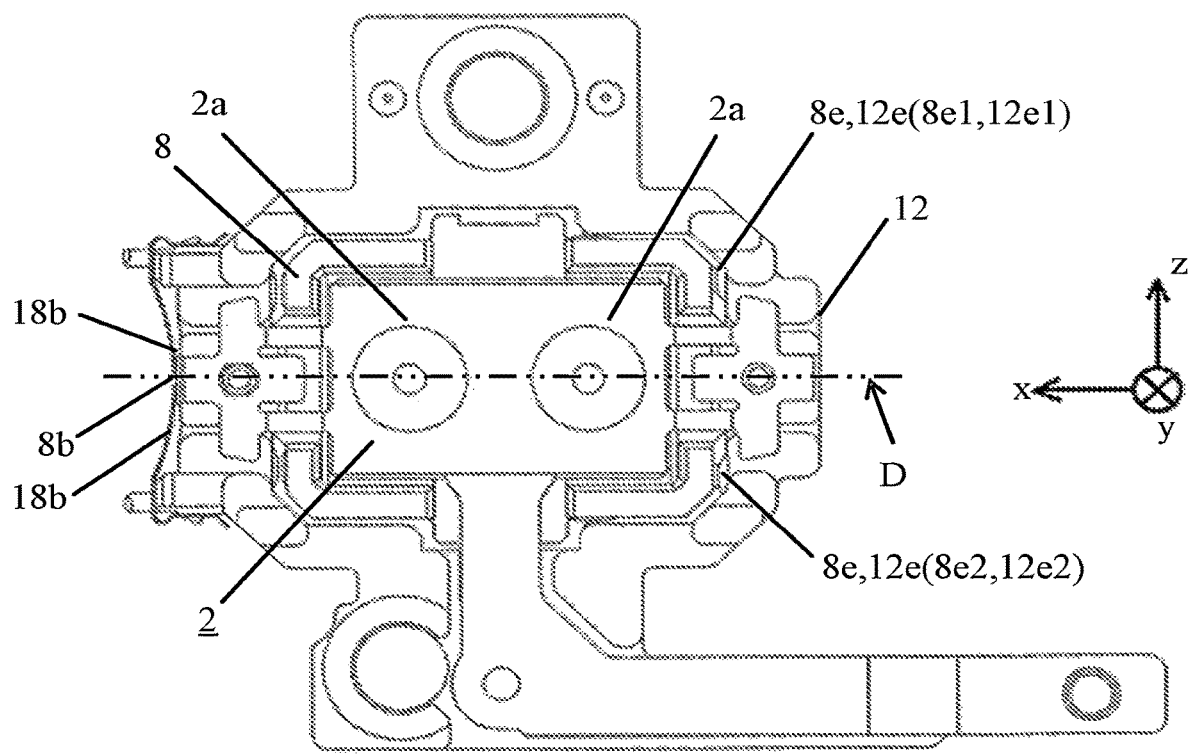

FIG. 5D is a plan view of the vibrator holding frame 8 that holds the vibrator 2, the movable unit outer frame 12, and the biasing leaf spring 18 viewed from the negative direction of the y-axis, which is the same direction as that of FIG. 4A. In FIG. 5D, an alternate long and two short dashes line D (a line in the second direction with respect to the thrust generating position) is a left-right symmetry plane including the driving protrusions 2a and 2b that generate the thrust. The reference surfaces 8e have cylindrical surface portions 8e1 and 8e2 having axes in the z-axis direction of the vibrator holding frame 8 and having a predetermined length. The reference surface 12e has plane portions 12e1 and 12e2 having a predetermined length in the y-axis direction of the movable unit outer frame 12. The cylindrical surface portions 8e1 and 8e2 and the plane portions 12e1 and 12e2 are arranged so that they contact each other at two positions symmetrical (line symmetrical) with respect to the alternate long and two short dashes line D, respectively. The resultant force of the two spring portions 18b of the biasing leaf spring 18 is applied to the protrusion portion 8b of the vibrator holding frame 8 on the alternate long and two short dashes line D, and the vibrator holding frame 8 and the movable unit outer frame 12 are integrated in the x-axis direction.

Figure 6A:
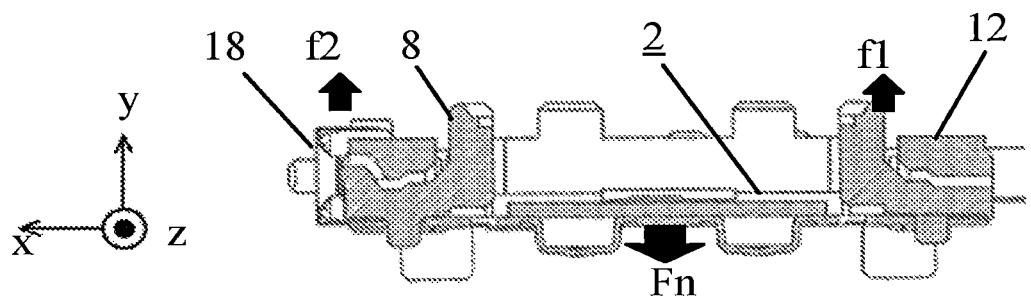
FIGS. 6A to 6C explain the effect of suppressing unnecessary vibration in this embodiment.
Figure 6B:
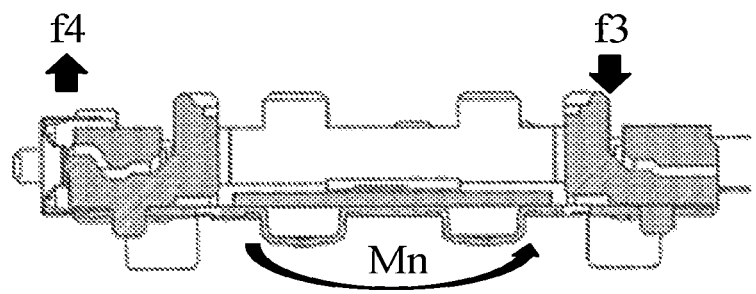
Figure 6C:
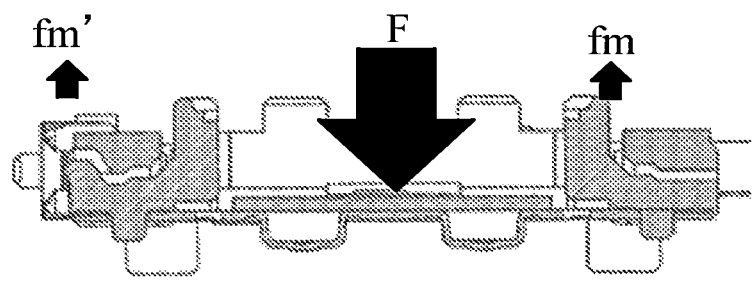

Referring now to FIGS. 6A to 6C, a description will be given of the effect of suppressing unnecessary vibration. FIGS. 6A to 6C explain the effect of suppressing unnecessary vibration. Similar to FIG. 5A, FIGS. 6A to 6C omit irrelevant members. As described above, the orientation of the movable unit outer frame 12 is determined in the yz plane via the movable member 14 and becomes stable.

Referring now to FIG. 6A, a description will be given of the suppressing action in a case where unnecessary vibration occurs in the vertical direction along the y-axis. A vector Fn is a vector of the maximum force of the unnecessary vibration. That is, it is assumed that a downward force acts on the vibrator holding frame 8 that holds the vibrator 2 at this instant. Then, a frictional force f1 is a frictional force that the vibrator holding frame 8 receives from the movable unit outer frame 12. A frictional force f2 is a frictional force that the vibrator holding frame 8 receives from the biasing leaf spring 18. If the frictional forces f1 and f2 are not larger than the maximum static frictional force, no unnecessary vibration occurs in the vertical direction. On the other hand, if the frictional forces f1 and f2 are higher than the maximum static frictional force, a dynamic frictional force acts while sliding, and the vibrational energy of the unnecessary vibration in the vertical direction can be attenuated, so that the generation of noise can be suppressed.

Referring now to FIG. 6B, a description will be given of unnecessary vibration around the pitch, which is rotation about the z-axis. A vector Mn is a vector of the maximum moment of unnecessary vibration. A frictional force f3 is a frictional force that the vibrator holding frame 8 receives from the movable unit outer frame 12 from this moment, and a frictional force f4 is a frictional force that the vibrator holding frame 8 receives from the biasing leaf spring 18. The frictional forces f3 and f4 act in opposite directions. Similar to FIG. 6A, if the frictional forces f3 and f4 are not larger than the maximum static frictional force, no unnecessary vibration occurs around the pitch. On the other hand, if the frictional forces f3 and f4 are higher than the maximum static frictional force, a dynamic frictional force acts while sliding, and the vibrational energy of unnecessary vibration around the pitch can be attenuated, so that the generation of abnormal noise can be suppressed.

Referring to FIG. 6C, a description will be given of a frictional force generated in the y-axis direction by a pressing force F in the y-axis direction for bringing the vibrator 2 into contact with the friction member 7 for stable driving and the pressing force by the biasing leaf spring 18 acting on the vibrator holding frame 8 in the x-axis direction. fm is the maximum static frictional force between the movable unit outer frame 12 and the vibrator holding frame 8, and fm' is the maximum static frictional force between the biasing leaf spring 18 and the vibrator holding frame 8. If the vibrator 2 and the friction member 7 are separated from each other and the pressing force F is larger than the sum of the maximum static friction forces fm and fm', the vibrator holding frame 8 that holds the vibrator 2 can be moved downward relative to the movable unit outer frame 12, and the contact between the vibrator 2 and the friction member 7 is maintained.

Referring now to FIG. 5D, a description will be given of the unnecessary vibration around the yaw, which is rotation around the y-axis. The vibrator holding frame 8 and the movable unit outer frame 12 contact each other at two locations that are symmetry with respect to the alternate long and two short dashes line D. The resultant force of the two spring portions 18b of the biasing leaf spring 18 applies a pressing force to the vibrator holding frame 8 on the alternate long and two short dashes line D, and an equal force acts on the two contact surfaces. The unnecessary vibration around the yaw needs a moment of the unnecessary vibration that overcomes the force acting on the contact surface. The line-symmetry arrangement of the contact positions can efficiently suppress the unnecessary vibration.

As described above, the vibration wave motor 1 includes a vibrator 2, a friction member 7, a first pressing unit (pressure intermediate member 9, tension coil springs 10, pressure plate 11), a first holding member (vibrator holding frame 8), a second holding member (movable unit outer frame 12), and a second pressing unit (biasing leaf spring 18). The vibrator 2 includes a piezoelectric body and an elastic body. The friction member 7 frictionally contacts the vibrator 2. The first pressing unit applies a pressing force in the first direction (y-axis direction) to the vibrator 2 to bring the vibrator 2 into contact with the friction member 7. The first holding member holds vibrator 2 and the second holding member holds the first holding member. The second pressing unit applies to the first holding member a pressing force in the second direction (x-axis direction) in which the vibrator 2 and the friction member 7 are displaced relative to each other by the generated thrust. The first holding member and the second holding member contact each other in the second direction due to the pressing force of the second pressing unit and are movable relative to each other in the first direction due to the pressing force of the first pressing unit.

The first holding member may have a first reference surface (reference surface 8e) and the second holding member may have a second reference surface (reference surface 12e). The first reference surface and the second reference surface may contact each other in the second direction due to the pressing force of the second pressing unit. The first reference plane and the second reference plane may contact each other at two positions (two cylindrical surface portions 8e1 and 8e2 and two plane portions 12e1 and 12e2). The first holding member may be pressed by the second pressing unit at the position of the alternate long and two short dashes line D (position of resultant force).

Figure 7:
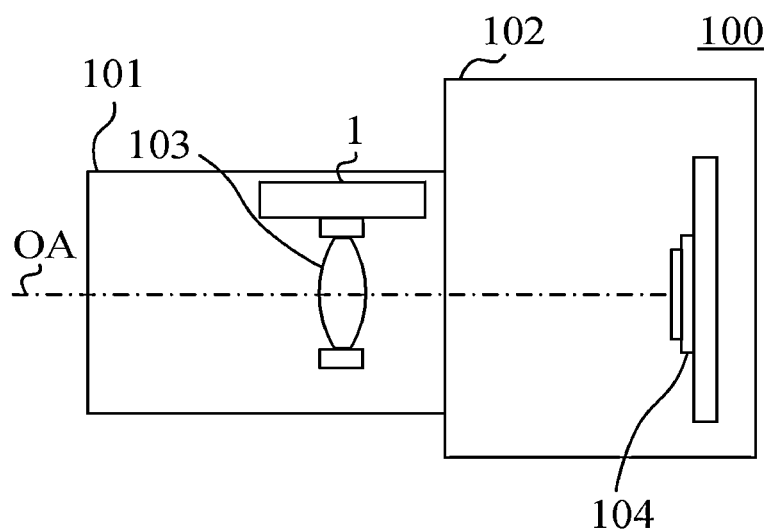
FIG. 7 schematically illustrates an image pickup apparatus having the vibration wave motor according to this embodiment.

Referring now to FIG. 7, a description will be given of an image pickup apparatus 100 having the vibration wave motor 1 according to this embodiment. FIG. 7 schematically illustrates the image pickup apparatus 100 having the vibration wave motor 1. In this embodiment, the lens apparatus 101 including the vibration wave motor 1 is mounted on the camera body 102. However, this embodiment is not limited to this example. In the image pickup apparatus 100 according to this embodiment, the lens apparatus 101 and the camera body 102 are integrated with each other, but the lens apparatus 101 may be an interchangeable lens attachable to and detachable from the camera body 102.

The image pickup apparatus 100 includes the lens apparatus 101 and the camera body 102. Inside the lens apparatus 101, an optical lens 103 as a driven member is connected to the connecting member 19 of the vibration wave motor 1, and moving the vibrator 2 of the vibration wave motor 1 causes the optical lens 103 to move in a direction approximately parallel to an optical axis OA. In a case where the optical lens 103 is a focus lens, the focus lens moves in the direction approximately parallel to the optical axis OA during imaging, and an object image is formed at the position of an image sensor 104 to generate an in-focus image. In this embodiment, the vibration wave motor 1 is applied to the optical lens 103 as a driven member, but this embodiment is not limited to this example. For example, the vibration wave motor 1 is applicable to another member such as the image sensor 104 as the driven member. A driving apparatus includes the vibration wave motor 1 and the driven member.

This embodiment can provide a vibration wave motor, a driving apparatus, a lens apparatus, and an image pickup apparatus, each of which can sufficiently suppress noise.

For example, the contact positions between the vibrator holding frame 8 and the movable unit outer frame 12 are not limited to two positions, and the biasing position of the biasing leaf spring 18 is not limited to a single position.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-040658, filed on Mar. 15, 2022, which is hereby incorporated by reference herein in its entirety.

What is claimed is:

1. A motor comprising:
a vibrator;
a contact member that contacts the vibrator;
a first pressing unit that applies a pressing force in a first direction to the vibrator to bring the vibrator into contact with the contact member;
a first holding member that holds the vibrator;
a second holding member that holds the first holding member; and
a second pressing unit that applies to the first holding member a pressing force in a second direction in which the vibrator and the contact member are displaced relative to each other by generated thrust,
wherein the first holding member and the second holding member contact each other in the second direction due to the pressing force of the second pressing unit, and
wherein the first holding member and the second holding member are movable relative to each other in the first direction by the pressing force of the first pressing unit.

2. The motor according to claim 1, wherein the first holding member has a first reference surface,
wherein the second holding member has a second reference surface, and
wherein the first reference surface and the second reference surface contact each other in the second direction by the pressing force of the second pressing unit.

3. The motor according to claim 2, wherein the first reference surface and the second reference surface contact each other at two positions that are line-symmetry with respect to a line extending in the second direction within a plane orthogonal to the first direction.

4. The motor according to claim 3, wherein the first holding member is pressed by the second pressing unit at a position of the line.

5. The motor according to claim 3, wherein the first reference surface has two cylindrical surface portions,
wherein the second reference surface has two plane portions, and
wherein the two cylindrical surface portions and the two plane portions contact each other at the two positions.

6. A driving apparatus comprising:
a motor; and
a driven member to be driven by the motor,
wherein the motor includes:
a vibrator;
a contact member that contacts the vibrator;
a first pressing unit that applies a pressing force in a first direction to the vibrator to bring the vibrator into contact with the contact member;
a first holding member that holds the vibrator;
a second holding member that holds the first holding member; and
a second pressing unit that applies to the first holding member a pressing force in a second direction in which the vibrator and the contact member are displaced relative to each other by generated thrust,
wherein the first holding member and the second holding member contact each other in the second direction due to the pressing force of the second pressing unit, and
wherein the first holding member and the second holding member are movable relative to each other in the first direction by the pressing force of the first pressing unit.

7. A lens apparatus comprising:
a motor;
a lens to be driven by the motor,
wherein the motor includes:
a vibrator;
a contact member that contacts the vibrator;
a first pressing unit that applies a pressing force in a first direction to the vibrator to bring the vibrator into contact with the contact member;
a first holding member that holds the vibrator;
a second holding member that holds the first holding member; and
a second pressing unit that applies to the first holding member a pressing force in a second direction in which the vibrator and the contact member are displaced relative to each other by generated thrust,
wherein the first holding member and the second holding member contact each other in the second direction due to the pressing force of the second pressing unit, and
wherein the first holding member and the second holding member are movable relative to each other in the first direction by the pressing force of the first pressing unit.

8. An image pickup apparatus comprising:
a camera body; and
the lens apparatus according to claim 7 attachable to and detachable from the camera body.

* * * * *